Oct. 30, 1928.
C. B. FUNK
1,689,429
GEAR LOCKING OR CLUTCH MECHANISM FOR GEAR CHANGE SETS
Filed April 20, 1925    2 Sheets-Sheet 1
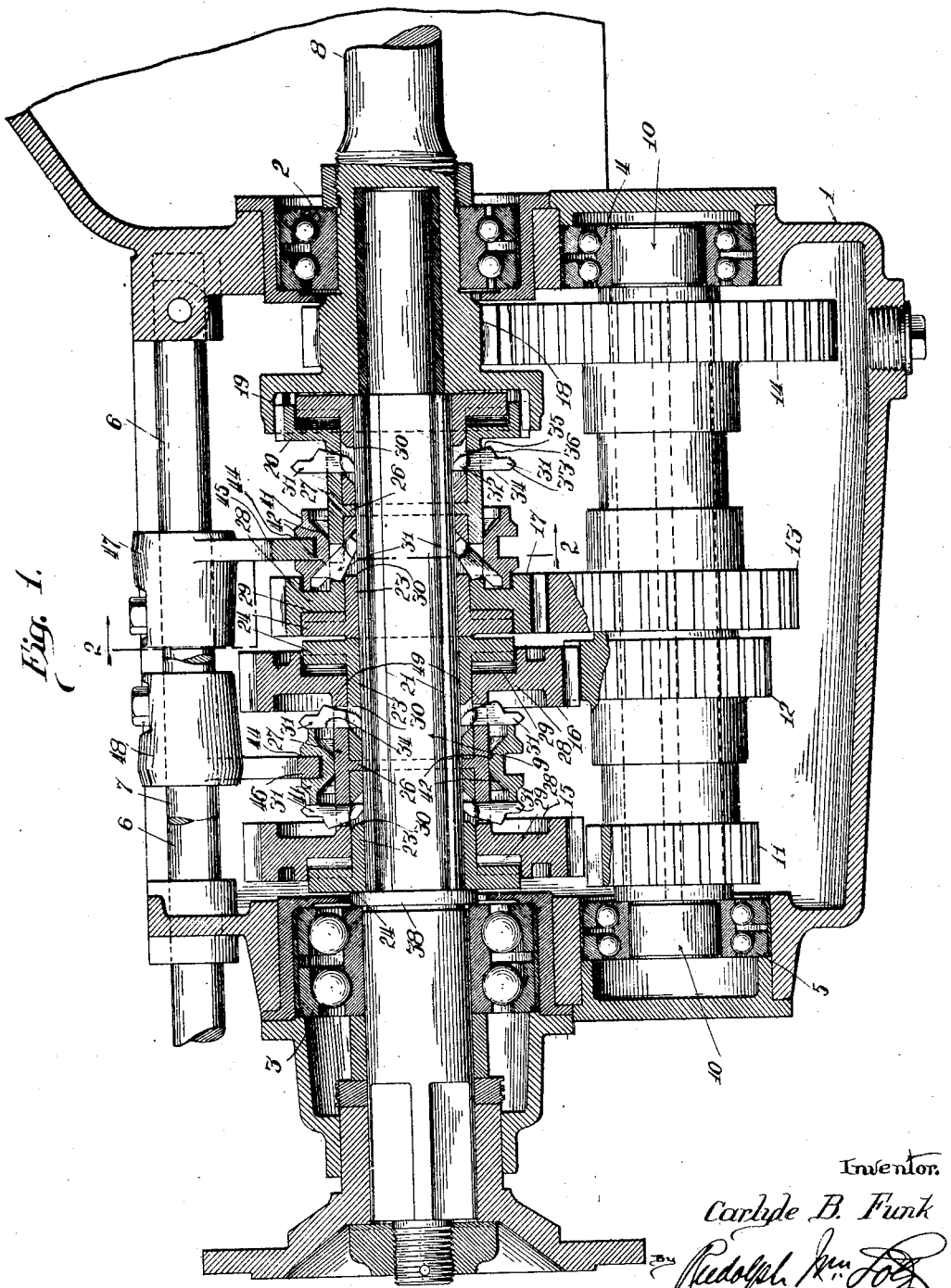
Inventor.
Carlyle B. Funk

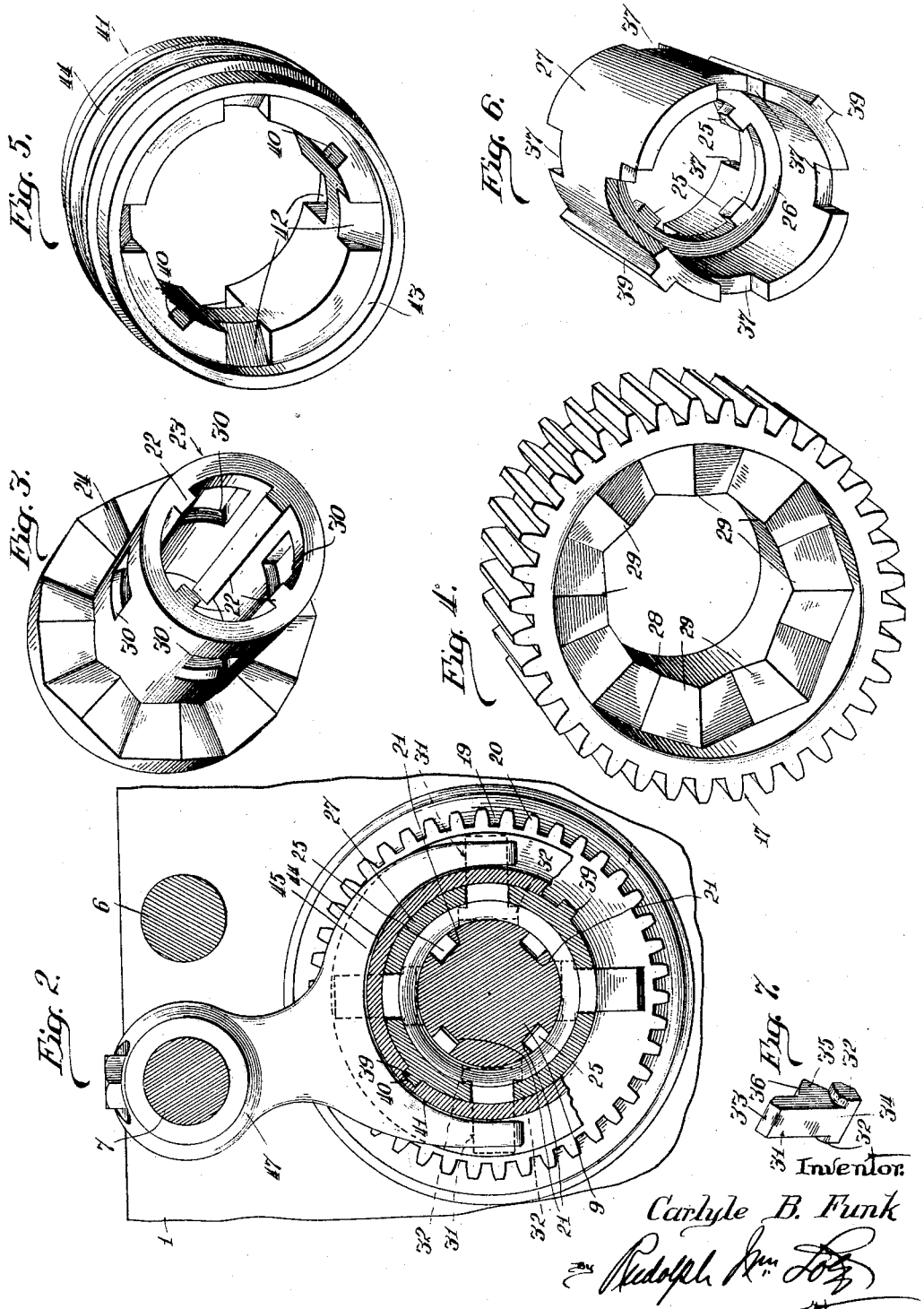

Patented Oct. 30, 1928.

1,689,429

UNITED STATES PATENT OFFICE.

CARLYLE B. FUNK, OF CHICAGO, ILLINOIS.

GEAR-LOCKING OR CLUTCH MECHANISM FOR GEAR-CHANGE SETS.

Application filed April 20, 1925. Serial No. 24,574.

This invention relates to that type of change-gear transmissions for automotive vehicles commonly known as constant-mesh transmissions as distinguished from sliding-gear transmissions, the main advantages of the former over the latter being well-known.

In the constant-mesh type of change-gear systems, the selected gear is locked to its shaft by either a common form of straight tooth "positive" clutch, or by various hub key devices. All of these systems may at times offer resistance to locking and all quite frequently stick or bind, and are hard to unlock or disengage.

The main object of the present invention is to provide gear-locking devices and controlling or actuating mechanism therefor, which, while effecting as positive a lock as either the straight-tooth clutch or the sliding or hub-key locking devices, possesses the characteristic of naturally running itself into locked engagement when operated and, also, of self-release with great ease when such release is desired, or, in other words, to provide gear-locking means which will move easily and smoothly into both inter-engaging and disengaging positions without noise or shock, and wherein the disengagement is automatically effected and wherein the grip of the locking elements upon each other automatically follows the increase or decrease in shaft-torque.

The foregoing object further comprehends the provision of interlocking elements which are of small size and weight, require only a very slight relative movement to effect engagement and release thereof, respectively, which present so large an area of interlocking means as to reduce the stress per unit of contact area to a very low point, wherein the load-thrust resulting from shaft-torque is carried by comparatively light and small elements readily capable of sustaining the same, wherein all possibility of chewing or burring and of looseness or back-lash is obviated, and which are so constructed and arranged that the gears associated with the respective sets of locking elements ride upon a continuously cylindrical surface portion of and are disposed between the active interlocking elements.

A further object of the invention is to provide gear-locking means, as aforesaid, which are so associated with the respective gears of the set as to insure complete mesh of the gears of any set over the entire width of faces thereof when effecting power transmission, while permitting a slight relative longitudinal displacement thereof when idle.

Other important objects of the invention are to effect gear-locking and gear-lock operation by wedging; to effect such a relative association between the gear lock and its operating mechanism as to cause all stresses due to the wedging action aforesaid to be borne by the operating mechanism wholly independently of the shaft; to provide means whereby the tendency inherent in the aforesaid wedge-stresses to oppose or resist gear-locking is overcome as soon as complete interlocking of the parts is effected to thereby prevent accidental releases, and, reversely, to permit said wedging stresses to act to automatically effect releases following an initial or unlocking movement of the controlling or actuating mechanism; to so effect locking of the wedge-mechanism as to provide an excess limit of safety against accidental releases either by the inherent tendency to same due to wedging action or by centrifugal or other forces; to provide controlling mechanism which is so associated with the gear lock as to obviate all relative rotation between the parts of the said controlling mechanism.

Other objects and advantages of the invention are set forth or will be apparent from the following specification:

The preferred embodiment of the invention is illustrated in the accompanying drawings, wherein—

Fig. 1 is a central longitudinal section of a change-gear transmission constructed in accordance with the invention.

Fig. 2 is a detail transverse section of the same on the line 2—2 of Fig. 1.

Figs. 3 and 4 are detail perspective views of a gear lock-element and a gear equipped with the companion lock-element, respectively.

Fig. 5 is a detail perspective view of an operating collar employed.

Fig. 6 is a similar view of a sleeve employed.

Fig. 7 is a similar view of a wedge-lock employed.

My said device comprises a suitable housing 1 equipped with suitable bearings 2, 3, 4 and 5, for the several shafts, and with suitable guides for the shift rods 6 and 7.

In the instance illustrated the device is designed to provide three different speeds forward, one speed reverse, which is the usual range adapted for automotive vehicles of the passenger type as distinguished from trucks, but other and further gear-lock may be provided for more speed ratios.

The clutch shaft 8 is journalled at one end in the bearing 2 and the main shaft 9 is journalled at one end in the hollow end of shaft 8 and, between its ends in the bearing 3. A counter-shaft 10 is journalled at its ends in the bearings 4 and 5 and rigid with the same are the several spur-gear pinions 11, 12 and 13 and the spur-gear 14.

The pinion 11 constitutes an element of the reversing gear train, which includes the spur-gear 15. The pinion 12 meshes with gear 16, this pair or set constituting the low or first speed transmission. Pinion or gear 13 meshes with gear 17, this pair or set constituting the second or intermediate speed transmission. Gear 14 meshes with pinion 18 on shaft 8 for continuously rotating shaft 10.

Shaft 8 also terminates in the internal gear 19 which is always in mesh with the spur-gear 20 which is concentric therewith and longitudinally movable relatively thereto.

The main shaft 9 is provided with a plurality of longitudinal key-grooves 21 which receive the several spline-ribs 22 of the hubs 23 of the gear lock-elements 24 and the projections 25 of the annular internal ribs 26 of the sleeves 27.

Each of the several gears 15, 16, 17 and 20 is provided with a web-portion 28, one face 29 of which constitutes the companion lock-elements to the gear-locks 24. The central bores of the said gears are adapted to receive and rotate upon the hubs 23 of the elements 24, the lock-faces in the flanges of the latter being opposed to the similar faces 29 of the webs of the said respective gears.

The said hubs 23 of the lock elements 24 are provided with radial openings 30 between contiguous spline-ribs 22, there being, preferably, four of the latter and four of said openings. Mounted in said openings are the base portions of wedge-levers 31, said base portions including the trunnions 32 projecting beyond the side faces of the said levers. The latter terminate in beveled end faces 33 disposed at an angle of about forty-five degrees to the plane face 34 thereof, and from the face opposite to and parallel with said face 34 there extends a V-shaped projection 35, one face of which extends from the base to an apex where it meets the face 36, also extending at an angle of forty-five degrees to the face 34 and substantially perpendicularly to the face 33.

The web of the gear rotatable on the hub 23 of a gear lock-element 24, is disposed between the openings 30 and the lock-face of said element, the wedge-levers 31 being so mounted in the openings 30 as to cause the projections 35 thereof to oppose the hub of the web of said gear.

The internal ribs 26 of the sleeves 27 are disposed between contiguous hubs of the gear lock-elements 24, there being only two of said sleeves 27 and four of said elements 24, the middle two of the latter being disposed in opposed relation or "back to back," and the outer two or end-elements 24 being also opposed to each other and each thereof to one of the middle elements, said ribs 26 constituting spacing elements for the respective pairs of opposed hubs 23. The ends of the latter project into the ends of said sleeves 27. The extremes of said sleeves 27 are provided with recesses 37 corresponding in width substantially with the outer end portions of the wedge-levers 31 and adapted to receive the latter, the side-walls of said recesses 37 partially overlapping the side portions of the openings 30 and thus coacting with the shaft 9 to confine the trunnions 32 of the wedge-levers 31.

As the outer flange elements 24 abut, respectively, against the hub portion of the internal gear 19 and a collar or annular flange 38 of the shaft 9, the ribs 26 of said sleeves 27 coact with said gear 19 and collar or flange 38 to securely retain said elements 24 in predetermined or fixed positions on the shaft 9 against longitudinal movement relatively to the latter.

Each of the sleeves 27 is provided externally with a plurality of longitudinal ribs 39 which engage in the corresponding grooves 40 in the bores of the operating sleeves 41, said bores of said sleeves terminating in annular shoulders which are provided with recesses 42 having their bottom walls extending at an angle of forty-five degrees to the sleeve axis, said shoulders constituting the terminals of the enlarged cylindrical bores 43. Each of said sleeves 41 (of which there are two) is provided with an annular external groove 44 in which the forked ends 45 and 46 of the shift collars 47 and 48, respectively, engage, the fork hub 47 being rigidly mounted on the rod 6 and the fork hub 48 similarly mounted on the rod 7.

The opposed lock-faces of the elements 24 and the webs of the gears constitute a series of intermeshing radial groove formations which are of considerable arcuate length each and very shallow, preferably not exceeding one-eighth inch in depth. These formations are preferably slightly V-shaped, the width of each of the convergent faces of each formation (be it male or female) being many times the depth of the latter. Thus said faces extend at very obtuse angles to a plane perpendicular to the axis of the shaft 9, this being very advantageous in promoting disengagement of said lock-faces from each other, as will be obvious. It is further advantageous in that a very slight relative axial movement of the opposed elements 24 and respective gears will serve to bring the lock-faces into or out of mesh and promote ease and smoothness of operation in effecting complete intermesh thereof.

Obviously, under the influence of shaft-torque the tendency of said faces to move out of mesh will be very strong and will be exercised in the shape of thrust stress against the wedge-locks 31, as will appear from the following description of the operation of the device.

It will be observed that when the sleeves 41 are disposed midway between the respective pairs of gears 15—16 and 17—20, they will be in neutral position, the counter-shaft 10 now rotating without transmitting motion to the shaft 9.

If now, for example, it is desired to rotate shaft 9 at first or low-speed to effect slow forward travel of the vehicle, the hub 48 of shifter arm 46 is moved to the right (or forward) by operation of the rod 7, to thereby correspondingly move the shifter sleeve 41 associated with said shifter arm. This will cause the right-hand end of said sleeve to bear upon the faces 34 of the set of wedge-levers 31 associated with gear 16, the V-shaped projections 35 of which bear against the end of the hub 49 of said gear. The latter, when idling moves slightly axially relatively to the counter-shaft pinion 12, so that it is not in mesh with the latter over entire width of face, but as it moved by the wedge-levers 31, under pressure of sleeve 41, to cause its grooved lock-face to move into mesh with the lock-face of the flange-element 24, it gradually reaches the position in which the side faces of the rims of gear 16 and pinion 12 are flush with each other, so that during power transmission intervals said gear elements are in mesh over their entire widths of face.

It will be observed that the lower faces of the V-shaped projections 35 of said levers 31 continue in engagement with the end of the hub 49 until the lock-faces aforesaid are completely in mesh. At this time said levers 31 extend at angles of about sixty degrees to the shaft axis and the lower faces of said projections 35 will have then passed out of engaging relation to the said hub 49, while the faces 36 of said projections, which are arcuate, concentric with the axes of pivotal movement of said levers, will pass into contact with said hub-end and during continued movement of said sleeve 41 (without, however, imparting further movement to said gear 16) the said levers 31 will be moved to their final positions at which they extend at angles of about forty-five degrees to the shaft-axis. At this moment the end of the sleeve 41 will have passed out of engaging relation to the plane faces 34 of said levers 31 and further movement of said sleeve will then cause the levers 31 to enter the notched recesses 42 in the ends of the bore, while the cylindrical inner rim face portion 43 will ride over the faces 33 at the ends of said levers and thus firmly lock the latter against reverse pivotal movement, the thrust-stress now exercised against the faces 36 of the projections 35, and tending to effect reverse pivotal movement of said levers, being now directed radially against the rim face 43 of the sleeve, this being true also of the centrifugal force tending to maintain the levers 31 in released positions.

The grooved lock-faces of the gears and the elements 24 are preferably rendered very smooth and accurately machined or formed, so that they may be very easily brought into and out of mesh. In the normal use of change-gear sets, the shaft 9 is wholly devoid of load at the time of effecting a speed change by release of the main clutch and the operating lever for effecting change-gear is so associated with the rods 6 and 7 as to permit only one of the sleeves 41 to be moved out of neutral position at any time.

From the foregoing description of the operation relative to driving shaft 9 at first or low speed, the operation for effecting higher speed or reverse rotation of said shaft, will be readily understood without further detailed description.

A very distinct advantage of the structure resides in the complete freedom of motion of the rotation of the gears 15, 16, 17 and 20, when idle, about the perfectly smooth portions of the hubs 23, it being obvious that the bores of the gears and the said hubs 23 may be provided with suitable bushings to reduce friction, etc., if desired.

It will also be noted that the driving load is distributed evenly over the entire area of the gear web and that the gear is thus held under pressure rigidly and evenly on the shaft, thus obviating any possibility of wobble, off center action, and wear; and which in other gear systems causes whining or warring and which off center action breaks down the bearings and chews up the gear teeth.

It will also be noted that all relative rotary movement between the sleeves 41 and the wedge-levers 31 is obviated and that the wear on said levers is very slight. Also that the thrust on said levers due to the tendency of the lock-faces of the gears and elements 24 to move out of mesh, is exerted principally against the outer end-walls of the openings in the hubs 23 and, as these walls are integral with the elements 24, this thrust-stress has no other effect than to place the levers 31 under compression stress and the hubs 23 under tension stress. The wedge-levers 31 furthermore effect such complete intermesh of the lock-faces as to entirely obviate all possibility of lost motion or backlash between the lock-elements.

The hubs 23 and sleeves 27 also serve to reinforce and stiffen the main shaft 9 and also render the whole assembly and disassembly easy and capable of being rapidly accomplished.

I claim as my invention:

1. In a change-gear set of the type set forth, a shaft, a gear wheel rotatable relatively to said shaft, a clutch element rigid with said gear, a sleeve on said shaft, a clutch element non-rotatable relatively to the shaft and associated with said sleeve, said clutch elements movable relatively to each other longitudinally of said shaft and having opposed faces provided with radial formations adapted to intermesh, wedge-like cam-members pivotally associated with one of said clutch elements for forced engagement with the other thereof to effect intermeshing, and a member movable longitudinally of said shaft and of the clutch element carrying said cam members for actuating the latter.

2. In a change-gear set of the type specified, the combination with a pair of opposed clutch members adapted to be moved into and out of engaging relation to each other, of means for effecting forced interengagement of said members, said means including pivoted cam elements associated with one of said members and having cam faces for engaging the other member, said cam faces coacting with the pivots of said elements to effect a wedge-like force on said clutch members, said faces arranged relatively to said pivots to permit ready release of the former from the member engaged thereby in response to separating movement of said members, and a sleeve slidable in the direction of relative reciprocal movement of said members and adapted to exert pressure on said cam-elements radially of the axis of said clutch-members for effecting forced movement of said cam elements and holding the same in position to maintain said clutch members interengaged.

3. A pair of relatively rotatable clutch members relatively movable longitudinally of their axes of rotation to effect interengagement and release thereof, a plurality of cam-elements carried by one of said members and pivotally movable thereon for engagement with the other thereof to effect forced interengagement of said members, said cam elements having faces adapted to exert a wedge-like pressure on the member engaged thereby and having said faces arranged to effect free pivotal movement of said elements in response to separating movement of said members, and a sleeve associated with said elements for effecting forced pivotal movement thereof in the direction for effecting forced inter-engagement of said members and holding the same in position to maintain said members interengaged by pressure on said elements radially of the axes of rotation of said members.

4. In a change-gear set including a shaft, a clutch element rigid therewith and having a hub, a wheel rotatable and slidable on said hub, a clutch element rigid with said wheel and opposing the first-mentioned clutch element, there being a plurality of longitudinal slots in said hub, a cam element adapted for swinging in a plane radial of the shaft pivotally associated with each of said slots and adapted, when swung in one direction, to engage and move said wheel to throw said clutch elements into interengagement, a sleeve slidable on and non-rotatable relatively to said hub for effecting the said swinging movement of said cam elements, and coacting means on the latter and said sleeve for locking said cam elements against retraction without exerting retractive force on said sleeve.

5. In a change-gear set including a shaft, a clutch element rigid therewith and having a hub, a wheel rotatable and slidable on said hub, a clutch element rigid with said wheel and opposing the first-mentioned clutch element, said clutch elements being of the positive, self-releasing type, there being a plurality of longitudinal slots in said hub, a cam element adapted for swinging in a plane radial of the shaft pivotally associated with each of said slots and adapted, when swung in one direction to engage and move said wheel to throw said clutch elements into interengagement, a sleeve slidable on and non-rotatable relatively to said hub for effecting the said swinging movement of said cam elements, and coacting means on the latter and said sleeve for locking said cam elements against retraction without exerting retractive force on said sleeve.

6. In a change-gear set including a shaft, a clutch element rigid therewith and having a hub, a wheel rotatable and slidable on said hub, a clutch element rigid with said wheel and opposing the first-mentioned clutch element, there being a plurality of longitudinal slots in said hub, a cam element adapted for swinging in a plane radial of the shaft pivotally associated with each of said slots and adapted, when swung in one direction, to engage and move said wheel to throw said clutch elements into interengagement, a sleeve slidable on and non-rotatable relatively to said hub for effecting the said swinging movement of said cam elements, said sleeve terminating in an annular flange having a cylindrical inner face within which the outer end portions of said cam elements are received as the latter attain the limit of said swinging movement, the said flange serving to prevent reverse swing of said cam elements and the latter exerting a radial pressure on said flange to thereby obviate end-thrust on said sleeve tending to effect retraction thereof.

7. In a change-gear set including a shaft, a clutch element rigid therewith and having a hub, a wheel rotatable and slidable on said hub, a clutch element rigid with said wheel and opposing the first-mentioned clutch element, said clutch elements being of the positive, self-releasing type, there being a plurality of longitudinal slots in said hub, a cam element adapted for swinging in a plane radial of the shaft pivotally associated with each of said slots and adapted, when swung in one direction to engage and move said wheel to throw said clutch elements into interengagement, a sleeve slidable on and non-rotatable relatively to said hub for effecting the said swinging movement of said cam elements, said sleeve terminating in an annular flange having a cylindrical inner face within which the outer end portions of said cam elements are received as the latter attain the limit of said swinging movement, the said flange serving to prevent reverse swing of said cam elements and the latter exerting a radial pressure on said flange to thereby obviate end thrust on said sleeve tending to effect retraction thereof.

8. In a constant mesh change gear power transmission device, a driving element and a driven element having engaging, intermeshing, shallow, radial grooved, clutch faces, which, impelled by the driving torque of the driven element, operate to run the elements apart, out of engagement, a locking device, employing tilting, wedging levers to hold the elements in driving relation and to release them when required, the first period of movement of said tilting, wedging levers having a multiplying leverage effect to force the locking elements into engagement and the final movement of said levers having a wedging action to lock the said elements and means to operate the said levers.

9. In a constant mesh change gear power transmission device, a driving element and a driven element having engaging, intermeshing, shallow radial grooved clutch faces, which, impelled by the driving torque of the driven element operate to run the elements apart out of engagement, a locking device, employing tilting, wedging levers to hold the elements in driving relation and to release them when required, the first period of movement of said tilting, wedging levers having a multiplying leverage effect to force the locking elements into engagement and the final movement of said levers having a wedging action to lock the said elements, the wedging angle of the wedging levers in their final locked position to be slightly less than enough for self retention, means to operate the said levers and means to retain and lock them in final operated position.

In testimony whereof, I have hereunto set my hand this 11th day of April, 1925.

CARLYLE B. FUNK.